(12) United States Patent
Rundini

(10) Patent No.: US 9,073,597 B2
(45) Date of Patent: Jul. 7, 2015

(54) CRANK SYSTEMS AND METHODS

(71) Applicant: Mauro Rundini, Huntsville, AL (US)

(72) Inventor: Mauro Rundini, Huntsville, AL (US)

( * ) Notice: Subject to any disclaimer, the term of this patent is extended or adjusted under 35 U.S.C. 154(b) by 0 days.

(21) Appl. No.: 14/063,314

(22) Filed: Oct. 25, 2013

(65) Prior Publication Data
US 2015/0114171 A1  Apr. 30, 2015

(51) Int. Cl.
B62M 3/00 (2006.01)
B62M 1/02 (2006.01)

(52) U.S. Cl.
CPC ........................ B62M 3/00 (2013.01)

(58) Field of Classification Search
CPC ....... B62M 3/00; B62M 3/06; B62M 2003/06
USPC ......... 74/594.1–594.3; 280/259–261; 474/12; 482/57
IPC ............................................. B62M 1/02, 3/00
See application file for complete search history.

(56) References Cited

U.S. PATENT DOCUMENTS

| | | | |
|---|---|---|---|
| 1,977,236 A | | 10/1934 | Lofquist et al. |
| 3,820,820 A | * | 6/1974 | Kutz .............................. 280/252 |
| 4,029,334 A | * | 6/1977 | Trammell, Jr. ................. 280/261 |
| 4,564,206 A | * | 1/1986 | Lenhardt ........................ 280/252 |
| 8,146,938 B2 | * | 4/2012 | Gobillard ....................... 280/259 |
| 8,162,338 B2 | | 4/2012 | Teal et al. |
| 8,628,102 B2 | * | 1/2014 | McClure ........................ 280/259 |

FOREIGN PATENT DOCUMENTS

WO    2011/007958 A2    1/2011
WO    WO 2011007958 A2 *    1/2011

* cited by examiner

Primary Examiner — Thomas R. Hannon
Assistant Examiner — Adam D Rogers
(74) Attorney, Agent, or Firm — Ann I. Dennen; Lanier Ford Shaver & Payne P.C.

(57) ABSTRACT

A crank system of the present disclosure has a rotating bar that is fixedly coupled to a first end of a first axle and for actuating a wheel, a first crank assembly coupled to the first end of the first axle and coupled to a first pedal, and a second crank assembly coupled to a second end of the first axle and a second pedal. The first crank assembly and the second crank assembly are coupled to the first axle such that the rotating bar is aligned with a wheel gear assembly adapted for rotating the wheel when the first pedal and second pedal are at their zenith and nadir positions, alternatively.

13 Claims, 15 Drawing Sheets

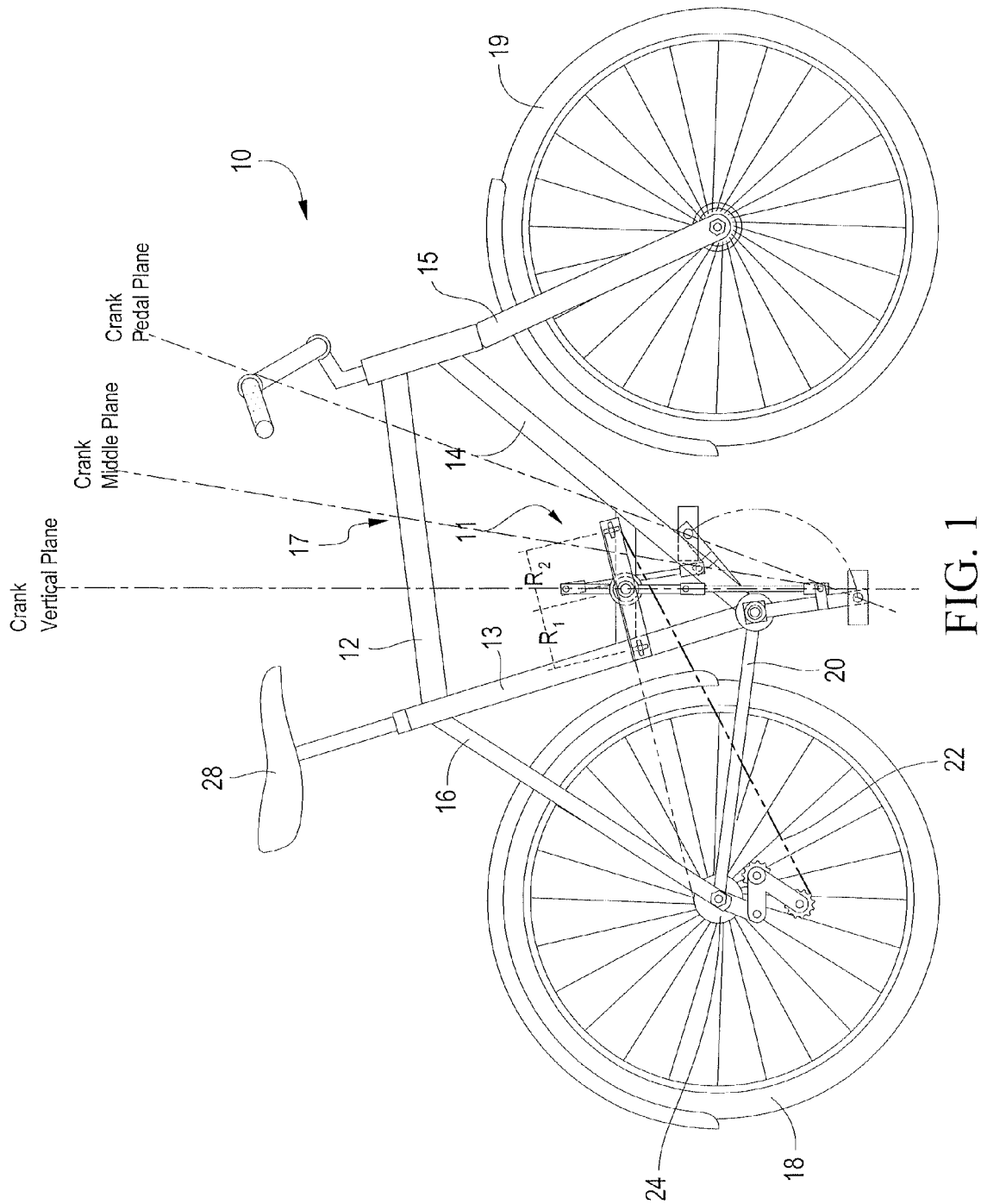

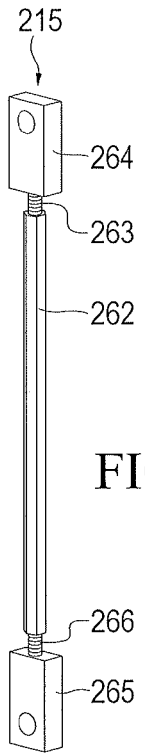
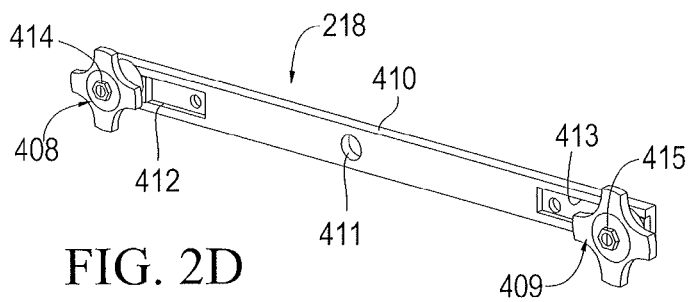
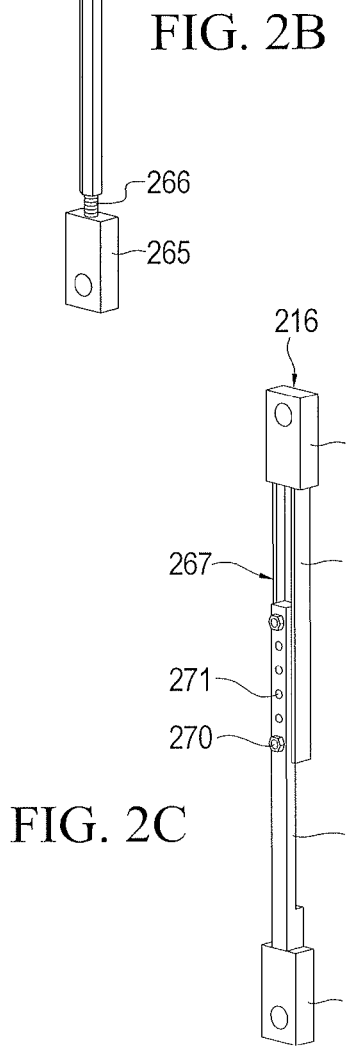
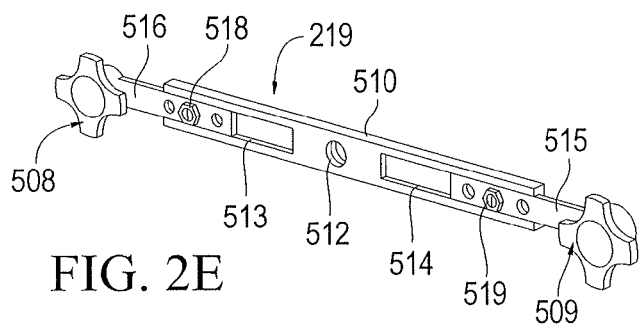
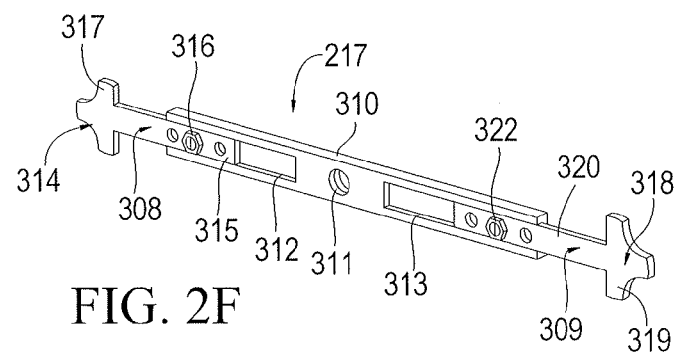
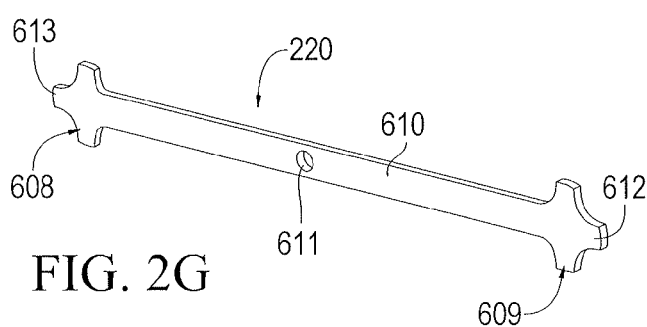
FIG. 2B
FIG. 2C
FIG. 2D
FIG. 2E
FIG. 2F
FIG. 2G

CRANK SYSTEMS AND METHODS

BACKGROUND

A drive train system of a bicycle is designed to translate a bicyclist's rotational pedaling motion and the power related thereto into linear motion. This translation enables a bicyclist to induce forward motion while riding the bicycle via rotation of the pedals with the bicyclist's feet.

The drive train typically comprises a set of pedals wherein each pedal is rotatably coupled to a crank arm, and each crank arm is fixedly coupled to a chain wheel. Conventionally, the chain wheel is round and a chain moveably interfaces with the teeth (or sprockets) of the wheel. Additionally, the chain moveably interfaces with gears coupled to a wheel. Thus, as the bicyclist rotates the pedals, the rotational movement induces rotation in the gears, which causes the wheel to rotate and the bicycle to move forward.

In a typical bicycle, as described hereinabove, a bicyclist rotates the pedals 360° in order to induce motion in the corresponding wheel. Due to the nature of the forces being cyclically applied to the pedals during rotation, the torque provided to the wheel is not uniform throughout the 360° cycle. In this regard, typically uniformity in the torque provided occurs in that portion of the rotation when the force applied is tangent to rotation.

SUMMARY

Generally, embodiments of the present disclosure provide a crank system that has a rotating bar that is fixedly coupled to a first end of a first axle and for actuating a wheel, a first crank assembly coupled to the first end of the first axle and coupled to a first pedal, and a second crank assembly coupled to a second end of the first axle and a second pedal. The first crank assembly and the second crank assembly are coupled to the first axle such that the rotating bar is aligned with a wheel gear assembly adapted for rotating the wheel when the first pedal and second pedal are at their zenith and nadir positions, alternatively.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 1 depicts a side elevation view of a bicycle having a crank system in accordance with an embodiment of the present disclosure.

FIG. 2B depicts another exemplary mid crank arm of the crank system such as is depicted in FIG. 2A.

FIG. 2C depicts another exemplary mid crank arm of the crank system such as is depicted in FIG. 2A.

FIG. 2D depicts another exemplary rotating bar of the crank system such as is depicted in FIG. 2A.

FIG. 2E depicts another exemplary rotating bar of the crank system such as is depicted in FIG. 2A.

FIG. 2F depicts another exemplary rotating bar of the crank system such as is depicted in FIG. 2A.

FIG. 2G depicts another exemplary rotating bar of the crank system such as is depicted in FIG. 2A.

DETAILED DESCRIPTION

Figure 2A:
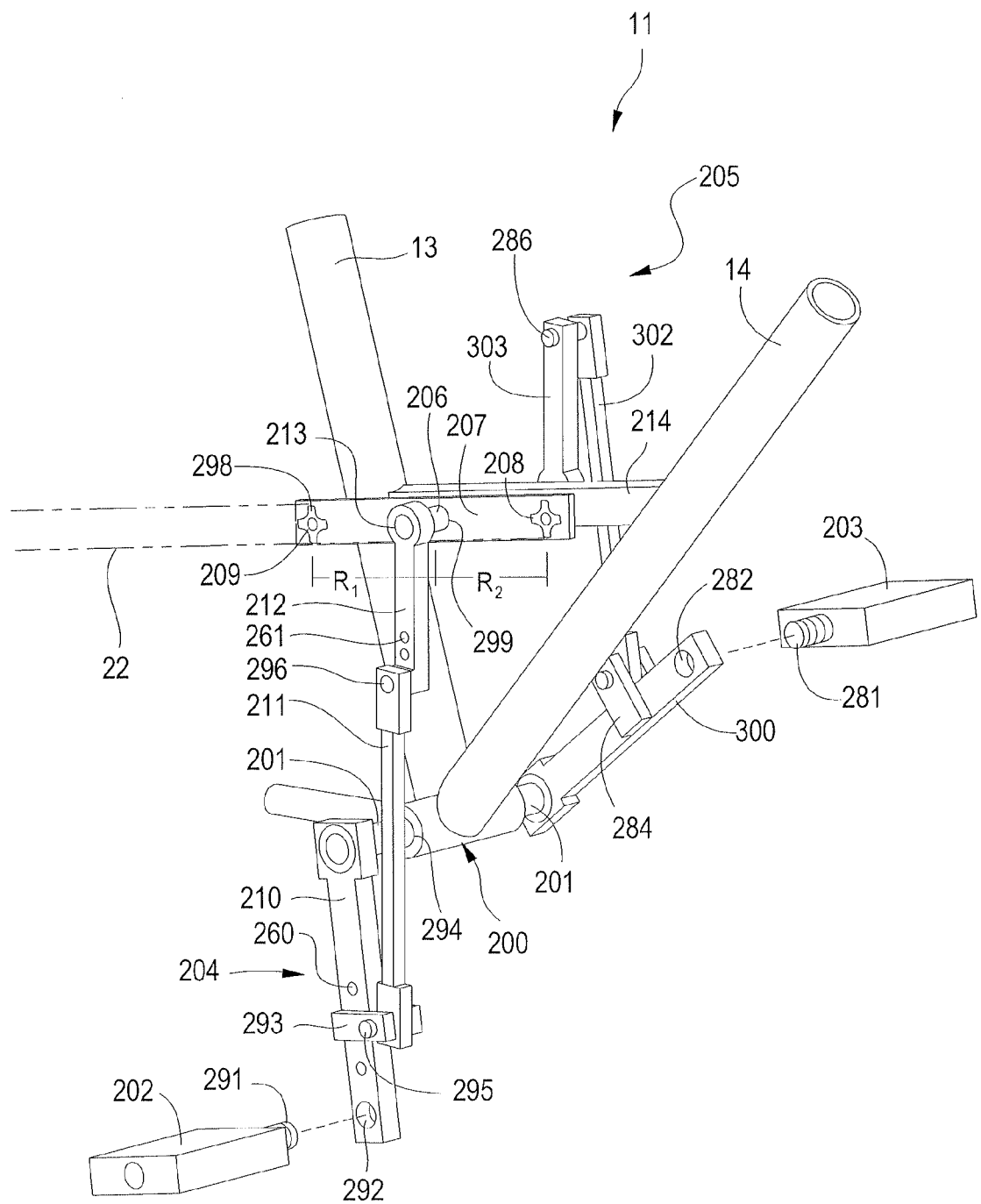
FIG. 2A depicts a chain-engaging side perspective view of the crank system such as is depicted in FIG. 1.

FIG. 1 depicts a bicycle 10 equipped with a crank system 11 in accordance with an embodiment of the present disclosure. As shall be discussed further herein, the crank system 11 while shown in FIG. 1 as operably coupled to the bicycle 10, the crank system 11 may also be operably coupled to any type of vehicle or any other device that is manually foot-powered. In this regard, the crank system 11 may be operably coupled to other types of vehicles that are fully or partially foot-powered or motor-powered vehicle. For example, the crank system 11 may be used on a recumbent, which is a vehicle in which the cyclist reclines (in a substantially horizontal position) when riding and operating the recumbent.

The bicycle 10 comprises an exemplary frame 17 coupled to a back wheel 18 and a front wheel 19. The bicycle frame 17 comprises a top tube 12, a head tube 15, a seat tube 13, a down tube 14, a seat stay 16, and a chain stay 20. Note that the terms "tube" and "stay" refer to structural members of the bicycle 10. A "stay" refers to a thin, usually straight structural member; whereas the term "tube" refers to any type of metal tubing. Each of the stays and/or tubes may be comprised of aluminum, steel, titanium, or any type of material known in the art or future-developed that can structurally withstand forces induced when such forces are applied to the frame for inducing forward motion in the bicycle 10.

The top tube 12 connects the head tube 15 to the seat tube 13. Notably, a seat 28 is coupled to a top of the seat tube 13. In one embodiment, the top tube 12 is welded at respective ends to the head tube 15 and the seat tube 13. The head tube 15 is coupled to the front wheel 19.

The down tube 14 connects the head tube 15 to a bottom bracket shell (not shown), which is a hollow receptacle portion of the frame for receiving a bottom bracket (not shown) that couples a crank system to the frame 17. In one embodiment, the hollow receptacle portion may be cylindrical and unitarily formed in the frame 17 for coupling the crank system 11 to the frame 17.

Additionally, the seat tube 13 extends from the seat 28 to the bottom bracket shell. Notably, as described further herein, the seat tube 13 is connected to the top tube 12 (described hereinabove) and the seat stay 16.

Further, the seat stay 16 and the chain stay 20 are each coupled to a fork end (not shown) that is coupled to an axle (not shown) coupling the wheel 18 to the frame 17. The chain stay 20 further connects to the bottom bracket shell as well. In the exemplary bicycle 10, the chain stay 20 runs parallel to a chain 22. Note that a fork end comprises an opening to which the axle of the wheel 18 is coupled.

The bicycle 10 incorporates a traditional diamond frame. Note however that the crank system 11 may be used on other types of frames in other embodiments. For example, in some modern mountain bicycles, the top tube 12 slopes downward toward the seat tube 13. The crank system 11 may also be used on such a bicycle configuration as well as any other frame configurations known in the art or future-developed.

As described hereinabove with reference to the exemplary frame 17, the various components, i.e., the top tube 12, the head tube 15, the down tube 14, the seat tube 13, the seat stay 16, and the chain stay 20 may be welded one component to the other to form the frame 17. However, other methods, other than welding, may be used in other embodiments to form a unitary frame 17.

The crank system 11 translates up and down pedaling motion (as opposed to rotating motion) effectuated by a bicyclist into rotating motion in the wheel 18. The crank system 11 enables more uniform torque transferred to the wheel 18, which is described further herein.

FIG. 2A depicts a chain-engaging side view of the crank system 11 in accordance with an embodiment of the present disclosure. The crank system 11 comprises a mounting bar 214 that is fixedly coupled to and between the down tube 14 and the seat tube 13. Such mounting bar 214 may be fixedly coupled, for example, via welding. Further, the crank system 11 comprises crank assemblies 204 and 205, which are described further herein. The crank assemblies 204 and 205 couple an axle 206 and a rotating bar 207 to pedals 202 and 203. The rotating bar 207 is coupled to cogs 208 and 209, wherein the cogs 208 and 209 are coupled to the rotating bar 207 on opposing ends of the rotating bar 207.

Note that in another embodiment, the crank system 11 may be rotated clockwise or counterclockwise by the point indicated by an axle 201, to be mounted at any angle with reference to the ground plane, i.e., the plane parallel to the ground relative to the bicycle 10 (FIG. 1).

In this regard, the rotating bar 207 may be rotated and fixedly coupled to the axle 206 such that the top of the cogs 208 and 207 align with the line tangent to the gear 24 (FIG. 1) when the pedal 202 or 203, have reached the zenith or nadir position, which is described further herein.

In one embodiment, the mounting bar 214 may be fixedly coupled to the down tube 14 and the seat tube 13 such that the mounting bar 214 is parallel with the top tube 12. However, the mount bar 214 may be fixedly coupled to the down tube 14 and the seat tube 13 such that it is at an angle relative to the top tube 12, as indicated hereinabove. In one embodiment, the mounting bar 214 may be mounted to just one tube. For example, the mounting bar 214 may be mounted only to seat tube 13, down tube 14, or top tube 12. Further, the mounting bar 214 may be mounted to any other part of the frame that allows operation as described.

In addition, the rotating bar 207 is rotatably coupled to the mounting bar 214 via an axle 206 that rotates within a bore (not shown) in the mounting bracket 214. The rotating bar 207 is fixedly coupled to the axle 206 via a bore 299. In this regard, the axle 206 extends through the bore 299, and an inside surface of the bore 299 is fixedly coupled to the axle 206. In one embodiment, the axle 206 is welded to the inside surface of the bore 299; however, the axle 206 may be fixedly coupled to the bore 299 via other methods in other embodiments. In one embodiment, the axle 206 may rotate in only one direction, i.e., clockwise from the perspective of the rotating bar 207 from the chain-engaging side of the crank system 11, as shown on FIG. 2.

The cogs 208 and 209, as identified hereinabove, comprise a series of teeth (or projections) 298 that interface with and induce movement in the chain 22 (FIG. 1). Note that in one embodiment, the cogs 208 and 209 have four (4) teeth as shown; however, fewer or additional teeth are possible in other embodiments. In another embodiment, in place of the cogs 208 and 209, the teeth may be formed in the outside perimeter of the rotating bar 207 to interface with and induce movement in the chain 22.

Further note that in one embodiment, the chain 22 is a roller chain that enables smooth engagement with the teeth of the cogs 208 and 209. However, other types of chains may be use in other embodiments of the present disclosure.

In addition, in one embodiment, the chain 22 may be replaced with a belt. The belt may be adapted for engagement with a gear/pinion system.

Note that the chain 22 is a motion transferring device. In this regard, the chain engages the rotating bar 207 and transfers the rotating motion to the gear assembly 24 and the wheel 18. Further, if a belt is employed in the above-described embodiment, it is also a motion transferring device.

Further note that FIG. 2A further shows radii $R_1$ and $R_2$ illustrated of the rotating bar 207. The length of the radii $R_1$ and $R_2$ defines the rotational diameter of the chain 22. Further, more than one rotating bar 207, having greater or lesser radii, may be fixedly coupled along to the axle 206. Further, the position of each cog 208 and 209 along the rotating bar 207 or the rotating bar itself may be adjustable, therefore changing the radii $R_1$ and $R_2$, as described further herein with reference to FIGS. 2D through 2G.

Additionally, the crank system 11 comprises a set of pedals 202 and 203. For purposes of this discussion, the pedal 202 is the pedal on the chain-engaging side of the crank system 11. Note that the chain-engaging rotating bar 207 may be implemented on either side of the crank system 11, and the non-chain-engaging side is described with reference to FIG. 3.

Note that the pedals crank arms 210 and 300 may be any length of pedal crank arm known in the art or future-developed. For example, the pedals crank arms 210 and 300 may be seventeen (17) centimeter or twenty-five (25) centimeter pedal crank arms.

Each pedal 202 and 203 is rotatably coupled to respective crank assemblies 204 and 205. In one embodiment, the crank assemblies 204 and 205 are substantially similar.

The crank assembly 204 comprises three crank arms, including a pedal crank arm 210, a mid crank arm 211, and a crank arm 212. The pedal crank arm 210 is rotatably coupled to the pedal 202 via an axle 291 and corresponding bore 292 on one end. On an opposing end of the pedal crank arm 210, the pedal crank arm 210 can be fixedly coupled or can be rotatably coupled to a bracket axle 201 that rotates within a bore 294 (FIG. 2A) and 283 (FIG. 3) in a bottom bracket shell 200. Note that the bracket axle 201 travels through the bore 294 through the width of the bottom bracket shell 200 protruding on the non-chain-engaging side of the bottom bracket shell 200 through the bore 283 for receiving the a pedal crank arm 300 of the crank assembly 205 on the non-chain-engaging side of the crank system 11, which is described further herein with reference to FIG. 3.

In one embodiment, the bottom bracket shell 200 and/or the bracket axle 201 and/or bore 294 and 283 can be mounted to any part of the frame of the bicycle. In one embodiment the axle 201 can be fixedly coupled to the bottom bracket 200 or to the frame.

A fixed distance from the end of the pedal crank arm 210 is a mounting bracket 293 coupled to the pedal crank arm 210. The mounting bracket 293 freely retains the mid crank arm 211 via a pin assembly 295 such that rotational movement is allowed on and about the pin assembly 295. Furthermore, the position of the mounting bracket 293 along the pedal crank arm 210 may be adjustable. In another embodiment, the mid crank arm 211 may be coupled directly to the pedal crank 210 via the pin 295 and mounted at a fixed or adjustable position along the pedal crank arm 210.

Further, the lengths of the crank arms 210, 211, and 212 may be adjustable. In this regard, the crank arm 212 comprises fastener openings 261 through which the pin 296 may be inserted for coupling the mid crank arm 211 thereto. The additional openings 261 allow the crank arm 212 to be adjustable. Additionally, the crank arm 210 comprises fastener openings 260 through which the pin 295 may be inserted for coupling the pedal crank arm 210 thereto. The additional openings 260 allow the crank arm 210 to be adjustable.

On an end opposite the pin assembly 295, the mid crank arm 211 is rotatably coupled to the crank arm 212 via a pin assembly 296. Notably, the mid crank arm 211 rotates relative to the crank arm 212 on or about the pin assembly 296.

The crank arms 212 and 303 are fixedly coupled to the axle 206, positioned at the opposite end of the axle 206 and longitudinally opposed relative to one another throughout the rotational cycle. In this regard, the rotational position shown in FIG. 2A wherein the pedal 202 is at its nadir and the pedal 303 is at its zenith, the end of the crank arm 212 that is coupled to the mid crank arm 211 is positioned below the axle 206; whereas, the end of the crank arm 303 that is coupled to the mid crank arm 302 is positioned above the axle 206. In this regard the terms "above" and "below" the axle 206 are referred along the "crank vertical plane" described further herein.

The term "rotational cycle" as used hereinabove refers to one complete 360° rotation of the rotating bar 207 and axle 206. In this regard, at 180° through the rotational cycle, the pedal 202 as shown in FIG. 2A would be positioned at its zenith and the pedal 203 would be positioned at its nadir.

The "crank vertical plane" as shown in FIG. 1, 7, 8, 9, is a reference surface passing through the crank arms 212, 303 and axle the 206, when one of the pedal 202 or 203 is at its nadir or zenith position.

The "crank pedal plane" as shown in FIG. 1, 7, 8, 9 is a reference surface passing through the center axles of the pin assemblies 291 and 281, when one of the pedal 202 or 203 is at its nadir or zenith position. In this regard, the terms nadir and zenith, for the pedals 202 and 203, are referred along to the "crank pedal plane".

The "crank middle plane", as shown in FIG. 1, 7, 8, 9, is a reference surface passing through the center axles of the pin assemblies 295 and 285 in the mounting brackets 293 and 284, when one of the pedal 202 or 203 is at its nadir or zenith position. In another embodiment the "crank middle plane" is a reference surface passing through the center axles of the pin 295 and 285 when the mid crank arms 211 or 302 are coupled directly to the pedal crank arms 210 and 300 and when one of the pedal 202 or 203 is at its nadir or zenith position.

The crank system 11, the crank system 21 and crank system 40, which are described further herein, may be mounted at any angle formed by the "crank vertical plane" and "crank middle plane". Furthermore, the crank system 11, the crank system 21 and crank system 40, may be mounted at any angle formed by the "crank middle plane" and "crank pedal plane."

FIGS. 2B and 2C depict exemplary mid crank arms 215 and 216 in accordance with an embodiment of the present disclosure that allow for adjusting the length of the mid crank arms 215 and 216. Two substantially identical mid crank arms 215 and 216 may replace the mid crank arms 211 and 302 depicted in FIG. 2A so that the mid crank arms are adjustable.

In this regard, the mid crank arm 215 may be attached via a coupler 264 to the pin 296 (FIG. 2A) and may be attached via a coupler 265 to the pin 295 (FIG. 2A). The mid crank arm 215 further comprises a shaft 262 that is threadedly coupled via a threaded portion 263 to the coupler 264 and threadedly coupled via a threaded portion 266 to the coupler 265. In such an embodiment, the length of the mid crank arm 215 may be adjusted by rotating the shaft 262 relative to the couplers 266 and 265.

Further, the mid crank arm 216 may be attached via a coupler 272 to the pin 296 (FIG. 2A) and may be attached via a coupler 273 to the pin 295 (FIG. 2A). The mid crank arm 216 further comprises a shaft 267. The shaft 267 comprises two sections, including section 268 and 269 that are slidably coupled one to the other. In this regard, fasteners 270, e.g., bolts or screws, may be loosened and/or removed from openings 271. When the fasteners 270 are removed or loosened, each section 268 and 269 may be slidably adjusted relative to the other, e.g., the sections may be pulled apart or pushed together thereby modifying the length of the crank arm 216.

FIGS. 2D through 2G depict rotating bars 217-220 in accordance with an embodiment of the present disclosure that allow for adjusting the radii R1 and R2 depicted in FIG. 2A.

FIG. 2D depicts the bar 218 comprising cogs 408 and 409 slidably attached to opposing ends of a bar member 410. The bar member 410 comprises a bore 411 through which the rotating bar 218 is coupled to the axle 206 (FIG. 2A). The bar member 410 comprises two channels 412 and 413 to which the cogs 408 and 409 are slidably coupled. Notably, the cogs 408 and 409 may comprise fasteners 414 and 415 that may be removed or loosened so that the cogs 408 and 409 may be moved in a direction away from the bore 411, thereby increasing the radii R1 and R2 shown in FIG. 2A, or toward the bore 411, thereby decreasing the radii R1 and R2.

FIG. 2E depicts the rotating bar 219 comprising cogs 508 and 509 that are coupled to or integrally formed with slide guides 516 and 515, respectively. The slide guides 515 and 516 are slidably attached to opposing ends of a bar member 510. The bar member 510 comprises a bore 512 through which the rotating bar 219 is coupled to the axle 206 (FIG. 2A). The bar member 510 comprises two channels 513 and 514 to which the slide guides 516 and 515 are slidably coupled. Notably, the slide guides 515 and 516 may comprise fasteners 518 and 519 that may be removed or loosened so that the slide guides 515 and 516 may be moved in a direction away from the bore 512, thereby increasing the radii R1 and R2 shown in FIG. 2A, or toward the bore 512, thereby decreasing the radii R1 and R2.

FIG. 2F depicts the rotating bar 217, which is similar to the rotating bar 219; however, the rotating bar 217 comprises sliding members 308 and 309. The sliding members 308 and 309 comprise toothed ends 314 and 318 integrally formed with slide guides 315 and 320. The toothed ends 314 and 318 comprise teeth 317 and 319 that engage the chain 22 (FIG. 1). The sliding members 308 and 309 are slidably attached to opposing ends of a bar member 310. The bar member 310 comprises a bore 311 through which the rotating bar 217 is coupled to the axle 206 (FIG. 2A). The bar member 310 comprises two channels 312 and 313 to which the sliding members 308 and 309 are slidably coupled. Notably, the sliding members 308 and 309 may comprise fasteners 316 and 322 that may be removed or loosened so that the sliding members 308 and 309 may be moved in a direction away from the bore 311, thereby increasing the radii R1 and R2 shown in FIG. 2A, or toward the bore 311, thereby decreasing the radii R1 and R2.

FIG. 2G depicts the bar 220. Bar 220 comprises a bore 611 through which the rotating bar 220 may be coupled to the axle 206 (FIG. 2A). The bar 220 comprises a bar section 610 integrally formed with toothed ends 608 and 609. The toothed ends 608 and 609 comprise teeth 613 and 612, respectively, which engage the chain 22 (FIG. 1). In this regard, the bar section 610 and the toothed ends 608 and 609 are an integrally formed unitary rotating bar.

Figure 3:
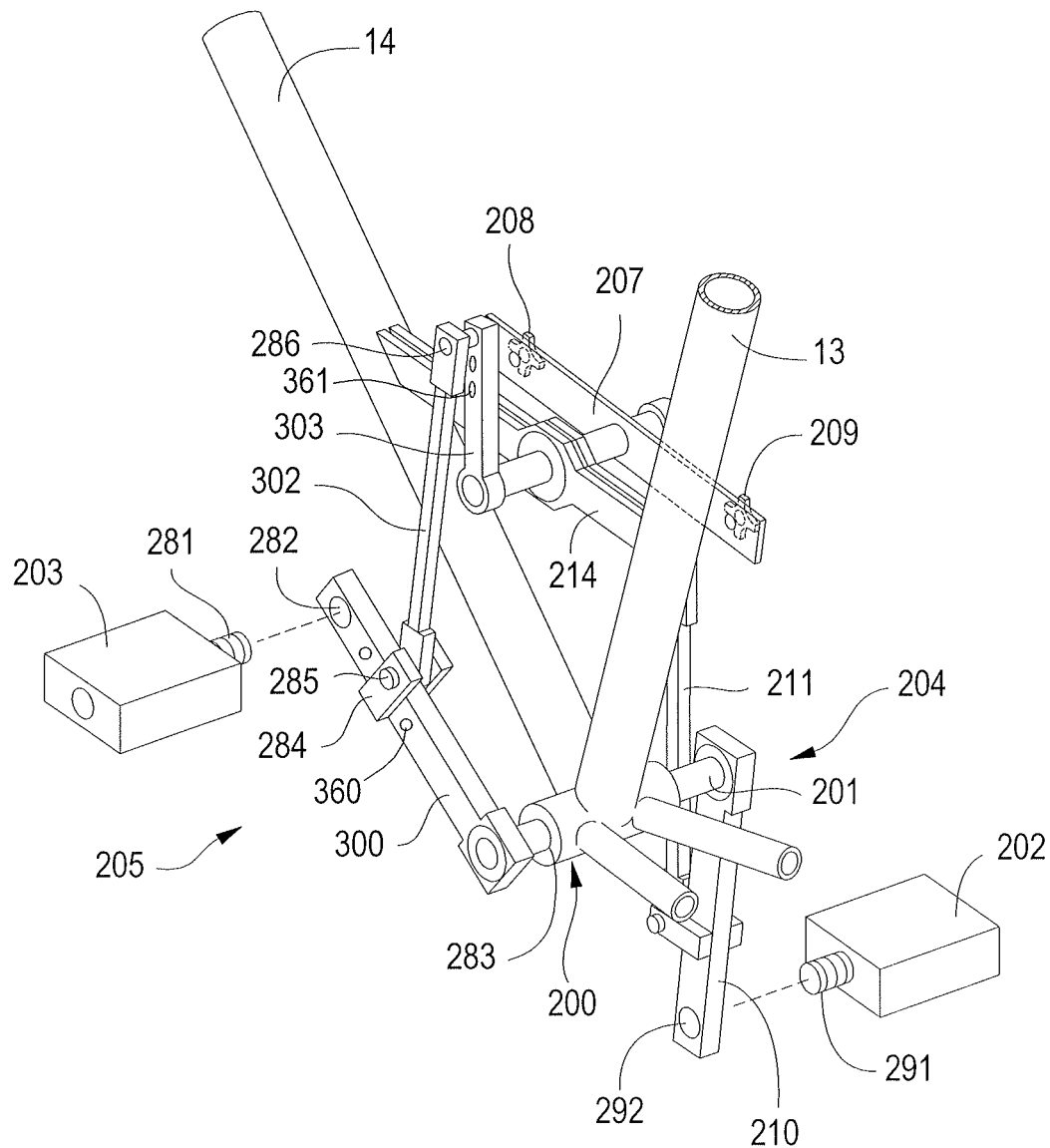
FIG. 3 depicts a non-chain-engaging side perspective view of the crank system shown in FIG. 2.

FIG. 3 depicts a non-chain-engaging side view of the crank system 11 in accordance with an embodiment of the present disclosure. Notably, in FIG. 3, the fixed mount bar 214 is shown fixedly coupled to and between the down tube 14 and the seat tube 13, as described hereinabove. In addition, the rotating bar 207 is visible as well.

As indicated hereinabove and is shown in FIG. 3, the crank system 11 comprises the pedals 202 and 203. The pedal 203 is the pedal on the non-chain-engaging side of the crank system 11, which is the side view shown in FIG. 3.

The pedal 203 is rotatably coupled to its corresponding crank assembly 205 substantially in the same manner that pedal 202 is coupled to its corresponding crank assembly 204. The crank assembly 205 comprises three crank arms, including a pedal crank arm 300, a mid crank arm 302, and a rotating bar crank arm 303. The pedal crank arm 300 is rotatably coupled to the pedal 203 via an axle 281 and corresponding bore 282 on one end. On an opposing end of the pedal crank arm 300, the pedal crank arm 300 can be fixedly coupled or can be rotatably coupled to the bracket axle 201 that rotates within the bore 294 (FIG. 2A) and 283 (FIG. 3) in the bottom bracket shell 200. As noted hereinabove, the bracket axle 201 travels through the bore 294 and through the width of the bottom bracket shell 200 protruding on the chain-engaging side of the bottom bracket shell 200 through the bore 283 for receiving the pedal crank arms 210 and 300 of the crank assemblies 204 and 205, respectively. Similar to the crank assembly 204 depicted in FIG. 2A, A fixed distance from the pedal end of the pedal crank arm 300 is a mounting bracket 284 coupled to the pedal crank arm 300. The mounting bracket 284 freely retains the mid crank arm 302 on a first end via a pin assembly 285 such that rotational movement is allowed about the pin assembly 285 Furthermore, the position of the mounting bracket 284 along the pedal crank arm 300 may be adjustable. In another embodiment, the mid crank arm 302 may be coupled directly to the pedal crank 300 via the pin 285 and mounted at a fixed or adjustable position along the pedal crank arm 300.

In addition, the lengths of the crank arms 300, 302, and 303 may be adjustable. In this regard, the crank arm 303 comprises fastener openings 361 through which the pin 286 may be inserted for coupling the mid crank arm 302 thereto. The additional openings 361 allow the crank arm 303 to be adjustable. Additionally, the crank arm 300 comprises fastener openings 360 through which the pin 285 may be inserted for coupling the pedal crank arm 300 thereto. The additional openings 360 allow the crank arm 300 to be adjustable.

On an opposing end the pin assembly 285, the mid crank arm 302 is rotatably coupled to the crank arm 303 via a pin assembly 286. Notably, the mid crank arm 302 rotates relative to the crank arm 303 on or about the pin assembly 286.

FIGS. 1, 2 and 3 depict a position of the crank system 11 wherein the pedal 202 of the chain-engaging side is at its nadir (i.e., at its lowest point in a cycle wherein a cycle consists of moving the pedals from nadir to zenith and back to nadir). Further, the pedal 203 on the non-chain-engaging side is at its zenith (i.e., at its highest point in a cycle). As shown in FIG. 1, when one pedal is at its zenith and the other is at its nadir, the rotating bar 207 is aligned with the top of the gear system 24.

With further reference to FIGS. 2 and 3, in one embodiment, a bicyclist may apply an upward and downward force to the pedals 202 and 203 that may be substantially perpendicular to the ground. Note that in another embodiment, the bicyclist may apply a force to the pedals 202 and 203 that is tangential to rotation of the pedals 202 and 203.

In this regard, the movement with respect to the pedals 202 and 203 is an up and down movement. Movement of the crank assemblies 204 and 205 that induces chain rotation and wheel rotation is described further with reference to FIGS. 6A-6I.

Note that there exists a variety of pedaling techniques that may be applied by the bicyclist in use of the crank assembly 11. The above technique described is for exemplary purposes only.

Figure 4:
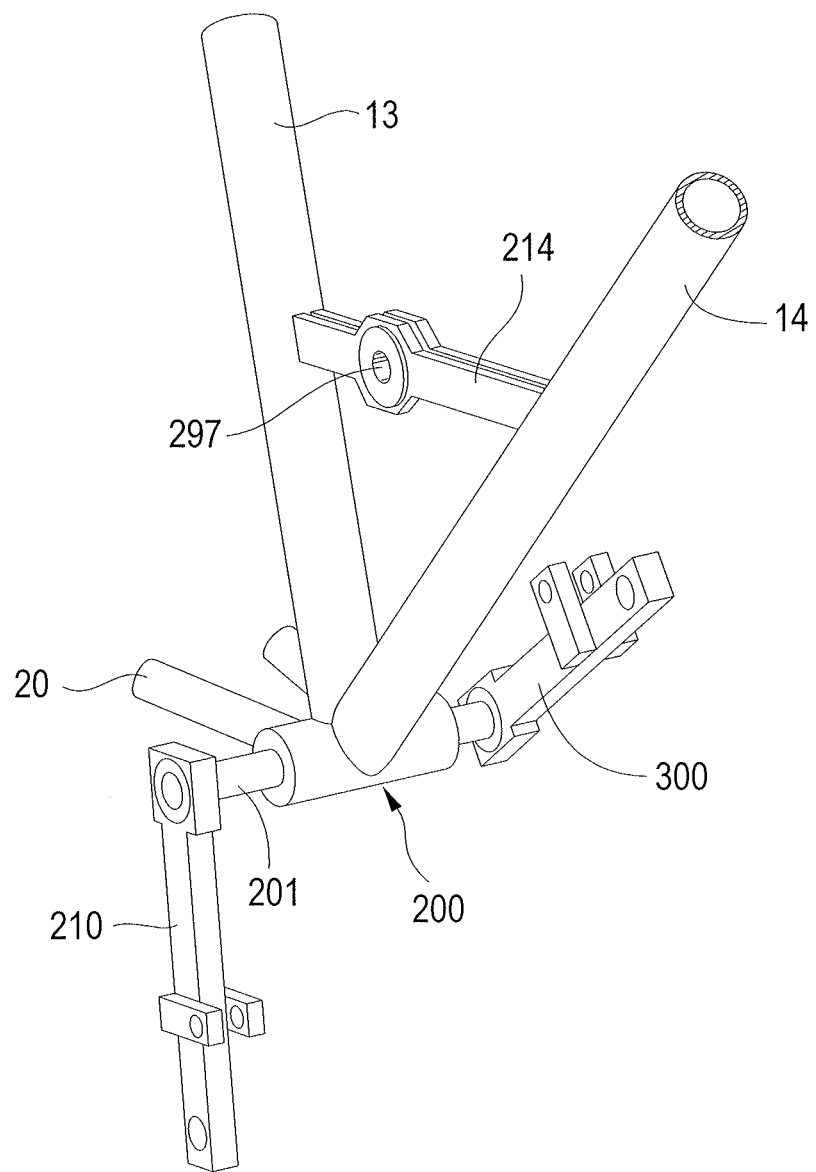
FIG. 4 depicts a cut away view of the crank system depicted in FIG. 1 showing an exemplary mounting bar and pedal crank.

FIG. 4 depicts a cut away view of the crank system 11. In this regard, FIG. 4 depicts the mount bar 214 coupled to the down tube 14 and the seat tube 13. In addition, FIG. 4 depicts pedal crank arms 210 and 300 to which the pedals 202 (FIG. 2A) and 203 (FIG. 2A) are coupled, respectively.

Figure 5:
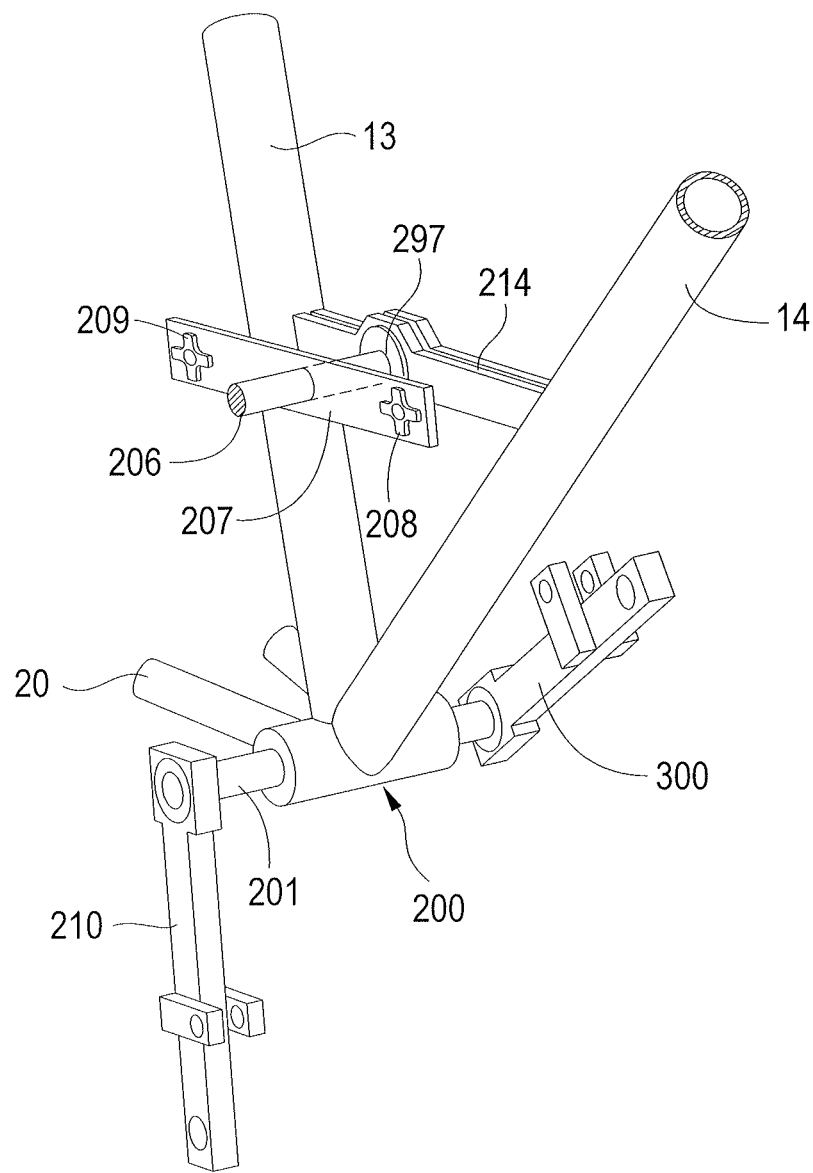
FIG. 5 depicts a cut away view of the crank system of FIG. 1 depicting an exemplary rotating bar coupled to the mounting bar depicted in FIG. 4.

FIG. 5 depicts another cut away view of the crank system 11 that further depicts the rotating bar 207. As described hereinabove, the rotating bar 207 is fixedly coupled to the axle 206, and the axle 206 is rotatably coupled to the bore 297 in the mounting bar 214. Thus, the rotating bar 207 rotates 360° as the pedals 202 and 203 are pedaled up and down via a force that may be perpendicular to the ground.

A complete cycle consists one pedal beginning at its nadir and the other at its zenith, each pedal being actuated so that it returns back to its nadir and zenith, respectively. Such a cycle results in a complete 360° rotation of the axle 206 and rotating bar 207.

Notably, when the rotating bar 207 rotates 360° in response to the forces applied to the pedals 202 and 203 through a cycle, the chain 22 (FIG. 1) engaging the cogs 208 and 209 moves as well, which induces movement of the wheel 18 (FIG. 1).

FIGS. 6A-6I depict operation of the crank system 11 illustrating in sequential order movement of the pedal crank arms and, in response, rotation of the axle 206 and rotating bar 207. In particular, FIGS. 6A-6I depict a 360° rotation of the axle 206 and rotating bar 207 induced by a bicyclist's actuation of the pedals 202 (FIG. 2A) and 203 (FIG. 2A), i.e., downward actuation of pedal 202 and upward actuation of pedal 203, in that order, through a complete cycle as described hereinabove.

Figure 6A:
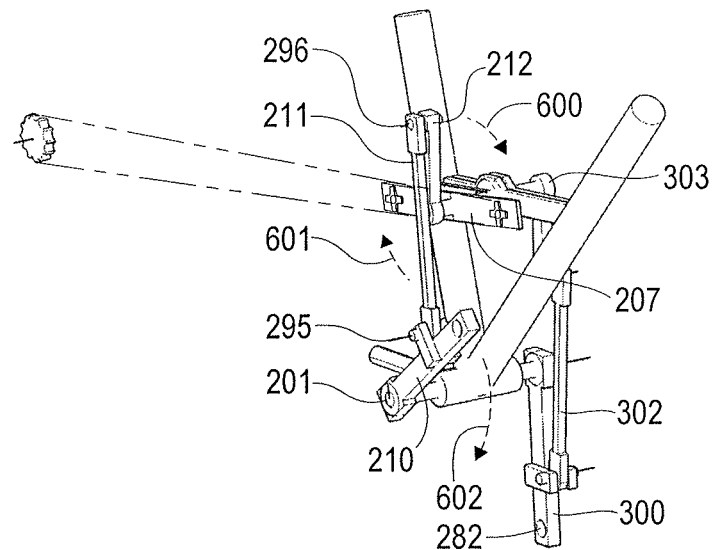
FIGS. 6A-6I depicts an exemplary complete rotation of the rotating bar resulting from translation of up and down movement as applied to pedals such as is depicted in FIG. 1.

In this regard, FIG. 6A depicts an initial position of the rotating bar 207 showing the cogs 208 and 209, which are in-line with the top of gear system 24 of the back wheel 18 and the pedal 202 is at its zenith and the pedal 203 is at its nadir. As is shown in FIG. 2A, the chain 22 (FIG. 2A) moveably couples to the cogs 208 and 209 such that when the rotating bar 207 rotates, rotation is caused in the chain 22. Note that the pedals 202 and 203 are not depicted in FIGS. 6A-6I for simplicity; however, pedal 202 is rotatably coupled to the pedal crank arm 210 via the bore 292, and pedal 203 is rotatably coupled to the pedal crank arm 300 via bore 282. In addition, in the initial position shown, mid crank arm 211 is positioned such that a portion of the mid crank arm 211 is rotated above the rotating bar 207 and the crank arm 212 is rotated above the rotating bar.

Furthermore, on the non-chain-engaging side of the crank system 11 (a side view of which is shown in FIG. 3), the corresponding like components are positioned in an extended position. In this regard, the pedal crank arm 300 is extended and the pedal 203 has been actuated to its nadir. Thus, the mid crank arm 302 and the crank arm 303 are extended downward below the rotating bar 207.

As operation proceeds, i.e., the pedal 202 is forced downward thereby actuating the pedal crank arm 210 in a direction indicated by reference arrow 602, the axle 206 and rotating bar 207 rotates in a direction indicated by reference arrows 700, 701, 600 and 601. Rotation of the axle 206 results from a downward, axial force on the crank arm 212 about the point located by the pin assembly 296.

In response to force applied to pedal 202, pedal 203 and the corresponding arms 300, 302, and 303 begin to rotate and in an opposite fashion. In this regard, as the pedal 202 is actuated downward, the pedal 203 begins to be pulled upward by rotation of the axle 206.

Figure 6B:
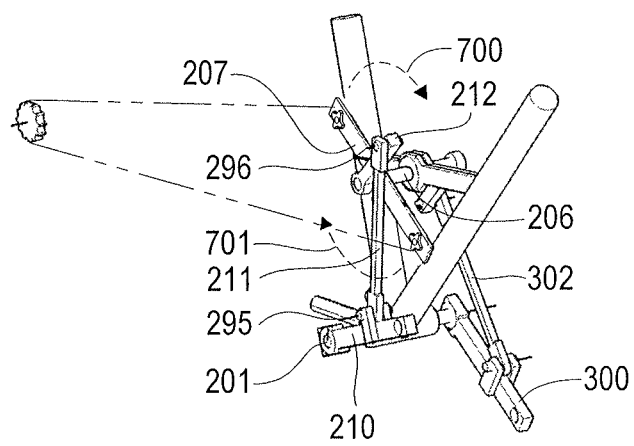

With reference to FIGS. 6A and 6B, as the downward force is exerted on the pedal crank arm 210, the pedal crank arm 210 rotates about the point located by the axle 201 as indicated by reference arrow 600 and 700. The downward force is transferred to the mid crank arm 211. The mid crank arm 211 rotates about the point located by the pin assembly 295. The downward force is transferred to the rotating bar crank arm 212 by the pin assembly 296 causing the axle 206 and the rotating bar 207 to rotate as indicated by reference arrows 601, 600 and 700, 701.

Figure 6C:
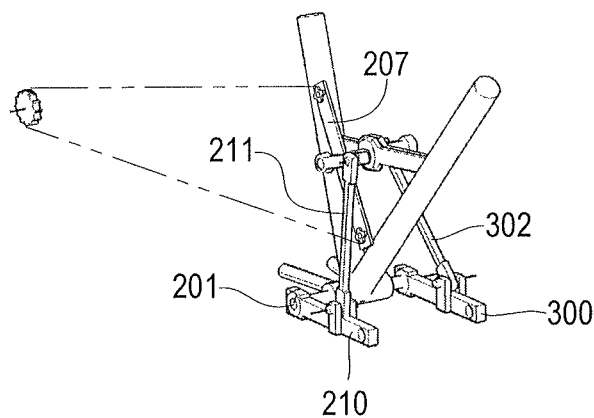
Figure 6D:
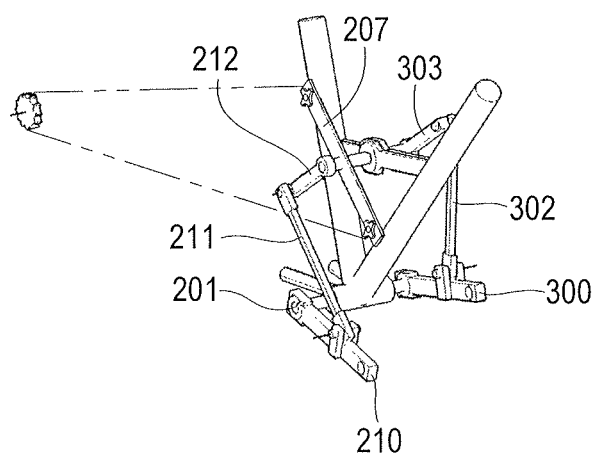
Figure 6E:
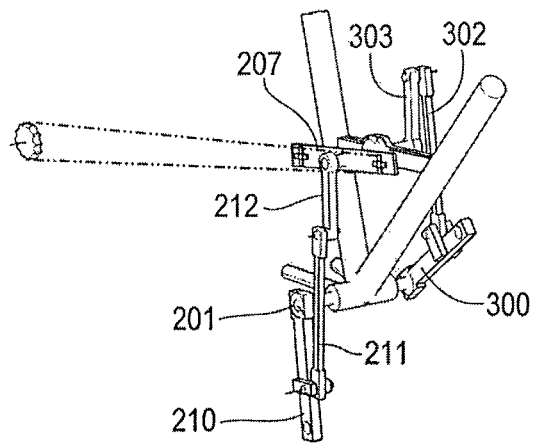
Figure 6F:
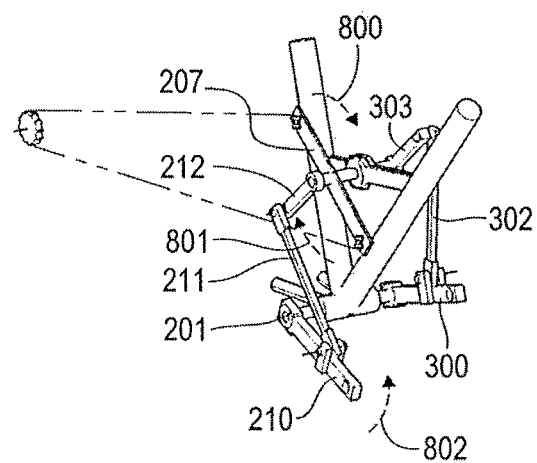

FIGS. 6C and 6D showed continued rotation of the axle 206 and the rotating bar 207 and downward movement of the pedal crank arm 210 until FIG. 6E. In FIG. 6E, the pedal crank arm 210 has been rotated to its full extent. In this regard, the pedal 202 to which the pedal crank arm 210 is rotatably coupled cannot be actuated downward any farther, and the pedal is at its nadir. Furthermore, the pedal 203 to which the pedal crank bar 300 is rotatably coupled cannot be pulled further upward, and thus opposite motion is initiated by downward force by the bicyclist on the pedal 203.

Figure 6G:
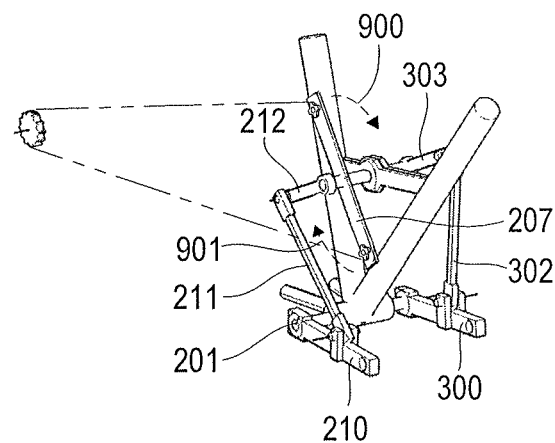
Figure 6H:
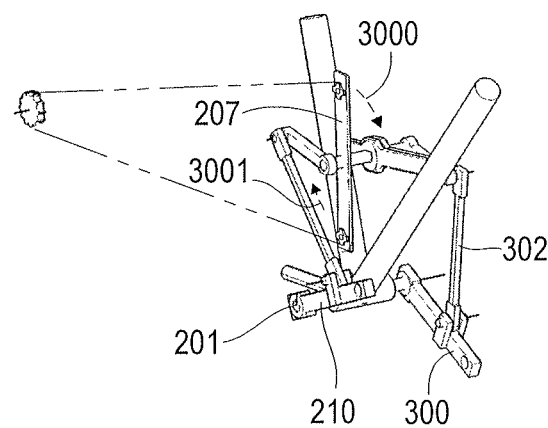
Figure 6I:
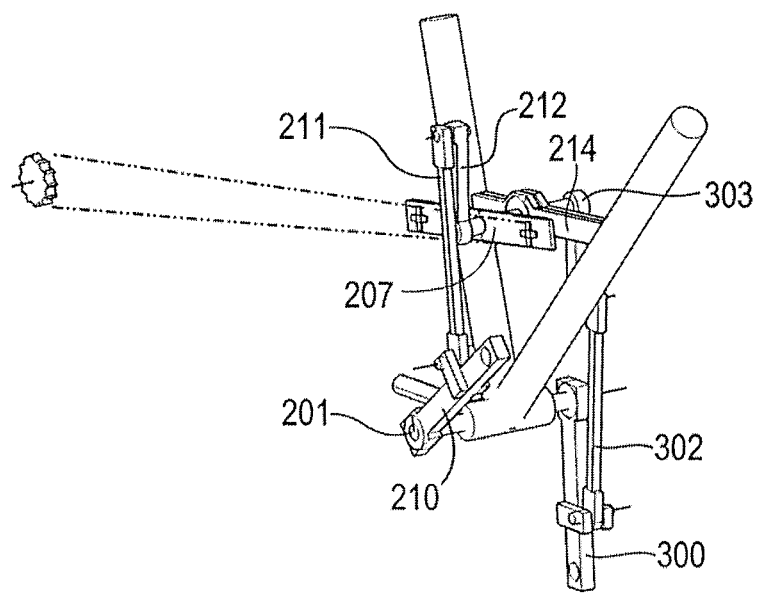

FIGS. 6F-6I show the 180° completion of a half-cycle of the rotating bar 207. In this regard, with reference to FIG. 6F, as the pedal 203 is forced downward and the pedal crank arm 300 moves downward, the pedal crank arm 210 begins to move upward toward the rotating bar 207 in a direction indicated by reference arrow 802 and the axle 206 and the rotating bar 207 continues rotation in a direction indicated by reference arrow 800. With reference to FIG. 6G, continued downward force on pedal 203 continues rotation of the axle 206 and the rotating bar 207 in a direction indicated by reference arrow 900, and with reference to FIG. 6H, continued downward force on pedal 203 continues rotation of the axle 206 and the rotating bar 207 in a direction indicated by reference arrow 3000 until the final phase of the rotation cycle. The final cycle-completion phase is depicted in FIG. 6I. Once the cycle is complete, the pedal crank arm 210 is again positioned such that the pedal 202 is at its zenith the mid crank arm 211 and the crank arm 212 are positioned above the rotating bar 207, and the top of the cogs 208 and 209 of the rotating bar 207 are in line with the gear system 24 (FIG. 1). Further, the pedal 203 is positioned again at its nadir and the mid crank arm 302 and the crank arm 303 are fully extended.

Figure 7:
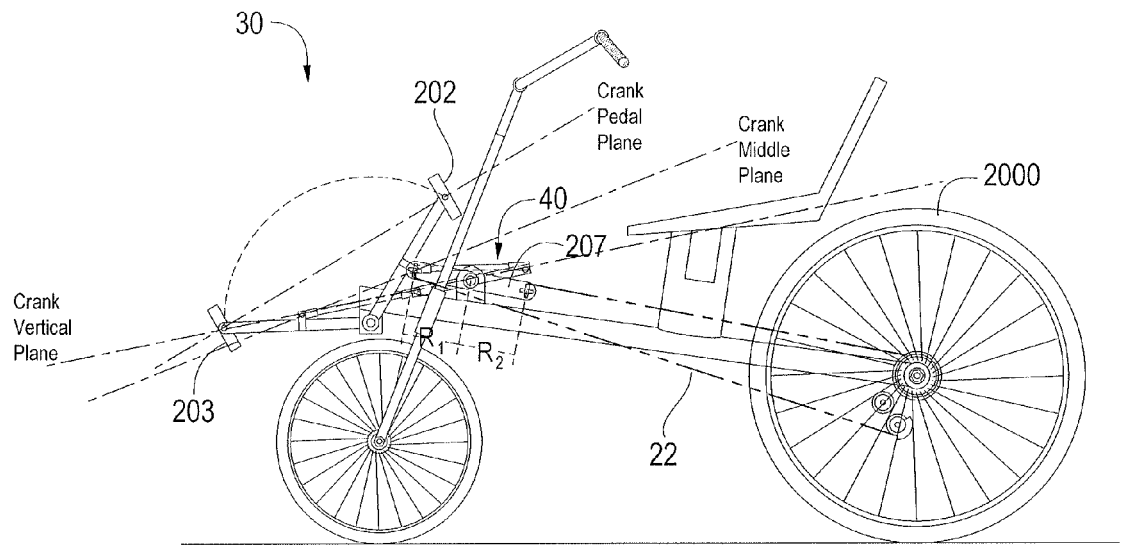
FIG. 7 depicts a non-chain-engaging side of another embodiment of the crank system such as is depicted in FIG. 1 implemented on a recumbent bicycle.
Figure 8:
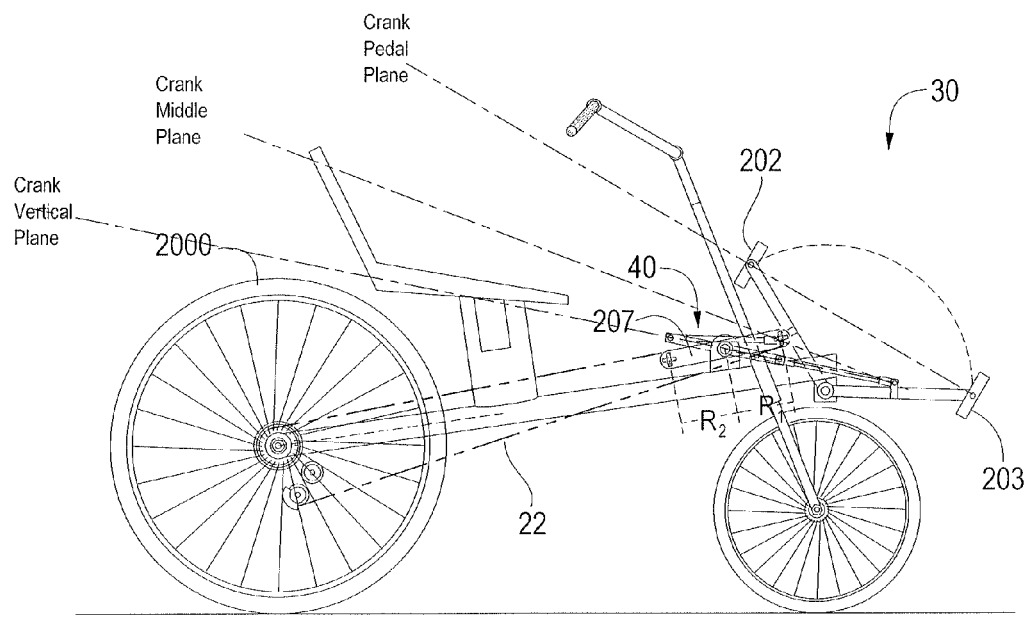
FIG. 8 depicts a chain-engaging side of the crank system such as is depicted in FIG. 7.

FIGS. 7 and 8 depict a recumbent bicycle 30 that comprises a crank system 40 in accordance with an embodiment of the present disclosure. In this regard, the crank system 40 is substantially similar to the crank system 11 depicted in FIG. 1; however, the crank system 40 is mounted to the bicycle 30, which is a recumbent bicycle. In one embodiment, the recumbent bicycle may further employ a bracket axle location mounted crank substantially similar to crank 21 which is further discussed herein.

FIG. 7 depicts a non-chain-engaging side of the recumbent bicycle 30. The crank system 40 comprises the rotating bar 207 that rotates when the pedals 202 and 203 are actuated by the bicyclist. The rotation induced in the axle 206 and rotating bar 207 actuates the gear system 24 of the back wheel 2000 causing the recumbent bicycle 30 to travel. FIG. 8 depicts the chain-engaging side of the recumbent bicycle 30.

Figure 9:
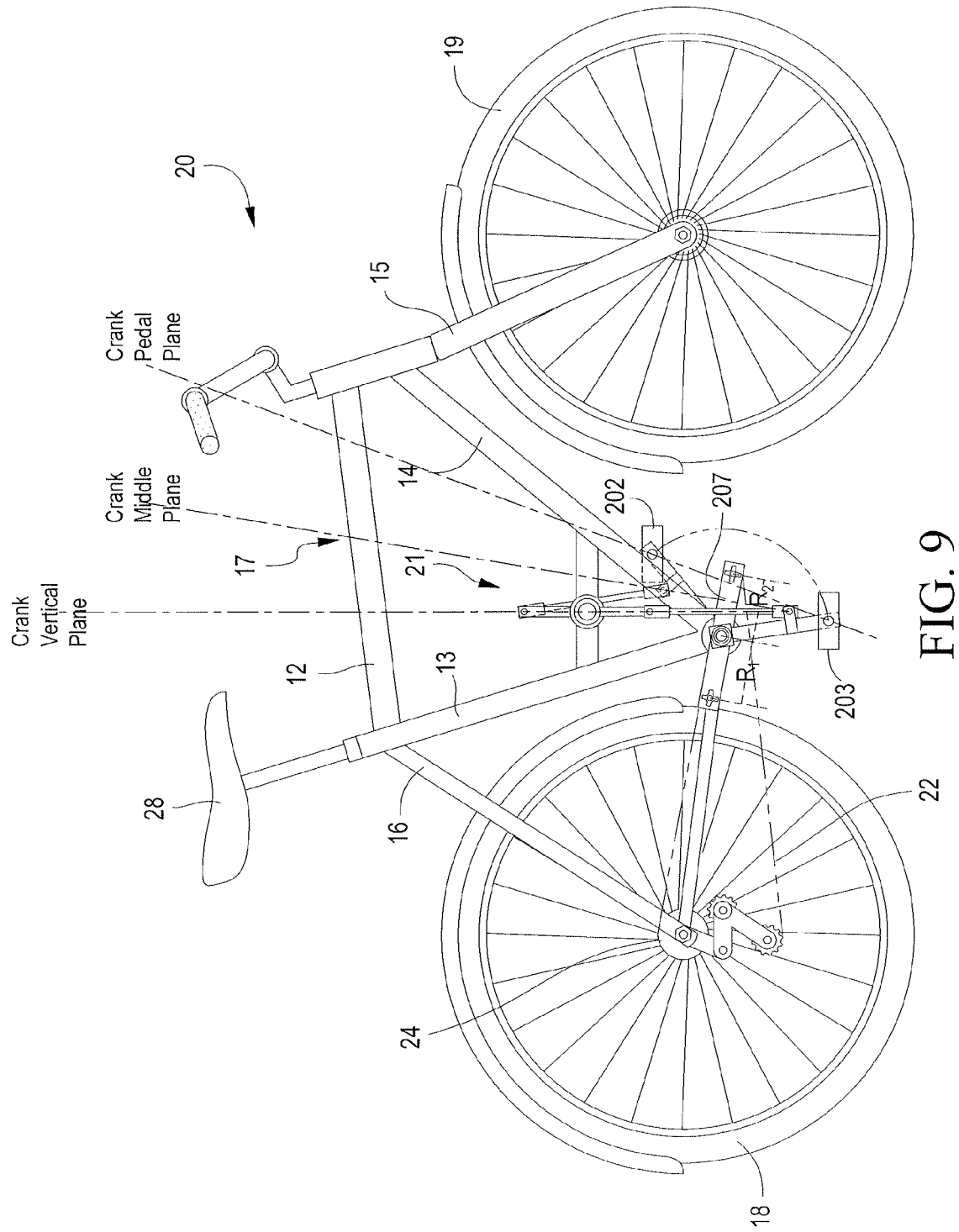
FIG. 9 depicts another embodiment of the crank system such as is depicted in FIG. 1 implemented at a bracket axle location of a bicycle.

FIG. 9 depicts a bicycle 20 equipped with a crank system 21 in accordance with another embodiment of the present disclosure. The bicycle 20 and the crank system 21 are substantially similar to the crank system 11 depicted in FIG. 1. In this regard, the crank system 21 may be operably coupled to other types of vehicles that are fully or partially foot-powered or motor-powered vehicle. For example, the crank system 21 may be used on a recumbent, which is a vehicle in which the cyclist reclines (in a substantially horizontal position) when riding and operating the recumbent.

In this regard, the bicycle 20 comprises the frame 17 coupled to the back wheel 18 and the front wheel 19. The bicycle frame 17 comprises the top tube 12, the head tube 15, the seat tube 13, the down tube 14, the seat stay 16, and the chain stay 20. Such structural components are linked and integrated as described hereinabove with reference to FIG. 1.

Similar to the crank system 11 (FIG. 1), the crank system 21 translates up and down pedaling motion (as opposed to rotating motion) effectuated by a bicyclist into rotating motion in the wheel 18. The crank system 21 enables substantially more uniform torque transferred to the wheel 18.

Figure 10:
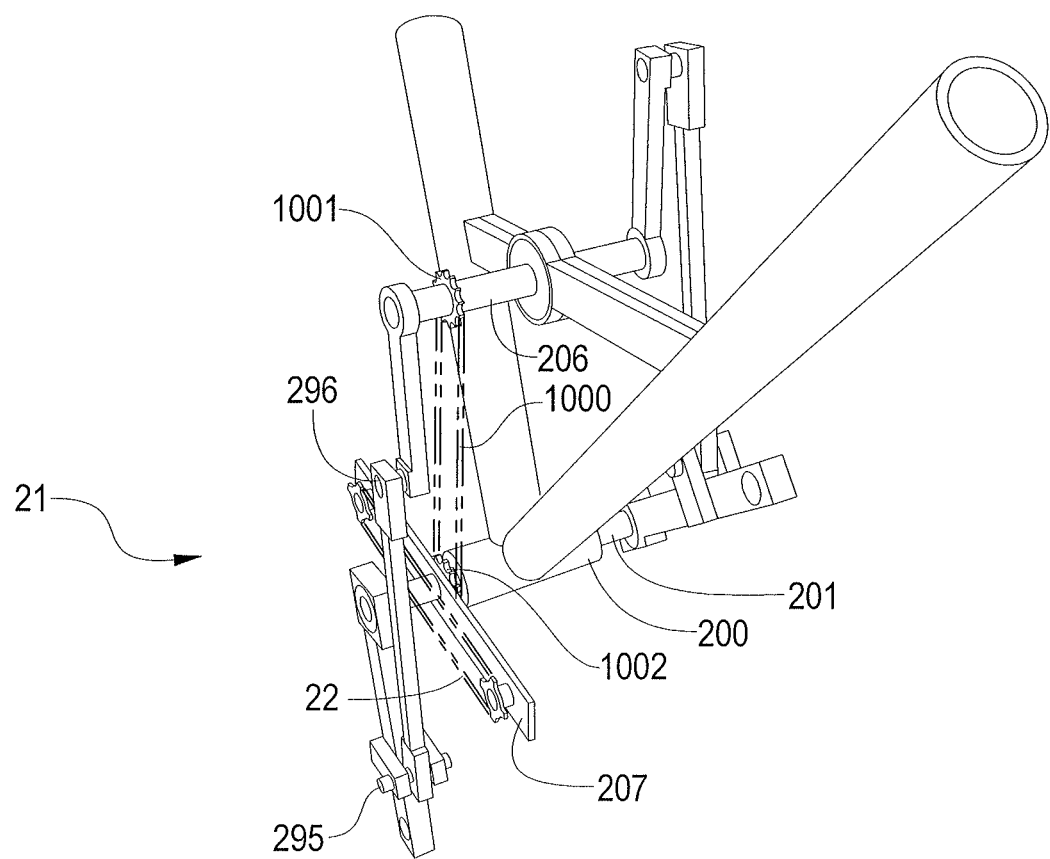
FIG. 10 depicts a chain-engaging side of the crank system such as is depicted in FIG. 9.

With reference to FIG. 10, the crank system 21 is substantially similar to the crank system 11. However, the rotating bar 207 is rotatably coupled to the bracket axle 201 that is rotatably or fixedly coupled within a bore in the bottom bracket shell 200. In one embodiment the axle 201 can be fixedly coupled to the bottom bracket 200 or to the frame. Further, the crank system 21 comprises a chain 1000 that engages a gear 1001 that is fixedly coupled to the axle 206 and a gear 1002 fixedly coupled to the rotating bar 207 and rotatably coupled to the bracket axle 201. In this regard, the rotating bar 207 is fixedly coupled to the axle 206 by the rotation of the gear 1001 and gear 1002, via the chain 1000. Motion induced in the axle 206, resulting from the bicyclist's actuation is transferred, via the gear 1001, the chain 1000 and the lower mounted gear 1002, to the rotating bar 207. Such rotation is transferred to the chain 22. Note that gears 1001 and 1002 have substantially similar radii length.

Further note that in one embodiment, the chain 1000 is a roller chain. However, other types of chains may be used in other embodiments of the present disclosure.

In addition, in one embodiment, the chain 1000 may be replaced with a belt. The belt may be adapted for engagement with a gear/pinion system.

Note that the chain 1000 is a motion transferring device. Further, if a belt is employed in the above-described embodiment, it is also a motion transferring device.

Figure 11:
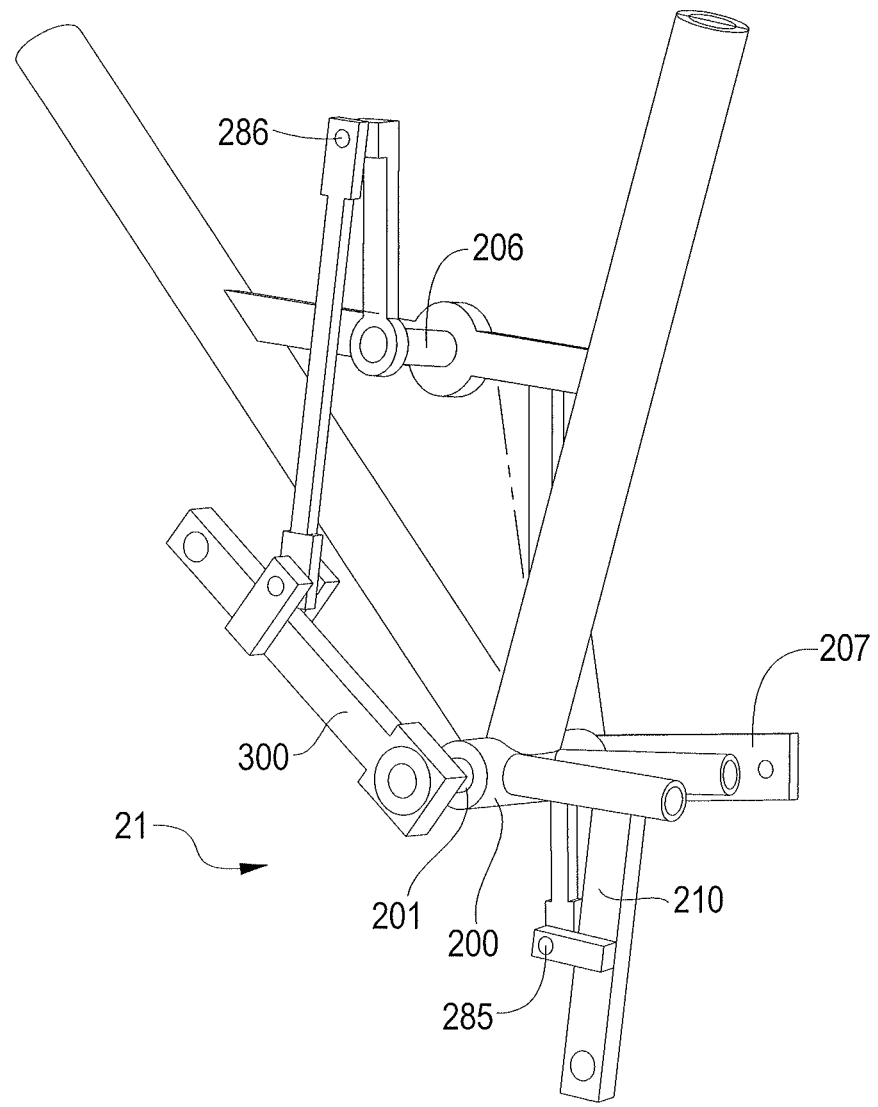
FIG. 11 depicts a non-chain-engaging side view of the crank system such as is depicted in FIG. 9.

FIG. 11 depicts the non-chain-engaging side view of the crank system 21. The crank system 21 may be rotated clockwise or counterclockwise by the point indicated by the axle 201 to be mounted at any angle with reference to the ground plane, i.e., the plane parallel to the ground relative to the bicycle 20 (FIG. 9). In this regard, substantially similar to the crank 11, the rotating bar 207 may be coupled such that the top of the cogs 208 and 209 align with the line tangent to the gear 24 (FIG. 9), when the pedal, 202 or 203 have reached the zenith or nadir position.

What is claimed is:

1. A crank system, comprising:
    a rotating bar fixedly coupled to a first end of a first axle, the rotating bar adapted for actuating a wheel;
    a first crank assembly coupled to the first end of the first axle and coupled to a first pedal;
    a second crank assembly coupled to a second end of the first axle and a second pedal,
    wherein the first crank assembly and the second crank assembly are coupled to the first axle such that the rotating bar is aligned with a wheel gear assembly adapted for rotating the wheel when the first pedal and second pedal are at their zenith and nadir positions, alternatively,
    wherein the first crank assembly comprises a first crank arm fixedly coupled to the first axle, a first mid crank arm, a first pedal crank arm, and the first pedal and the second crank assembly comprises a second crank arm fixedly coupled to the first axle, a second mid crank arm, a second pedal crank arm and the second pedal, and
    wherein the first crank arm fixedly coupled to the first axle and the second crank arm fixedly coupled to the first axle are adapted such that during rotation the first crank arm fixedly coupled to the first axle and the second crank arm fixedly coupled to the first axle are positioned longitudinally opposed during a rotational cycle, and the first mid crank arm is rotatably coupled to the first crank arm, and the first pedal crank arm is rotatably coupled to the first mid crank arm and the first pedal.

2. The crank system of claim 1, wherein the second mid crank arm is rotatably coupled to the second crank arm and the second pedal crank arm is rotatably coupled to the second mid crank arm and the second pedal.

3. The crank system of claim 2, wherein the first pedal crank arm is rotatably coupled to a first end of a second axle.

4. The crank system of claim 3, wherein the second pedal crank arm is fixedly coupled to a second end of the second axle.

5. The crank system of claim 2, wherein the second pedal crank arm is rotatably coupled to one end of a second axle.

6. The crank system of claim 5, wherein the first pedal crank arm is fixedly coupled to another end of the second axle.

7. The crank system of claim 1, wherein the zenith and nadir positions of the first or second pedal are relative to a crank pedal plane.

8. The crank system of claim 1, further comprising at least one additional rotating bar.

9. A crank system, comprising:
    a rotating bar fixedly coupled to a first end of a first axle, the rotating bar adapted for actuating a wheel;
    a first crank assembly coupled to the first end of the first axle and coupled to a first pedal;
    a second crank assembly coupled to a second end of the first axle and a second pedal,
    wherein the first crank assembly and the second crank assembly are coupled to the first axle such that the rotating bar is aligned with a wheel gear assembly adapted for rotating the wheel when the first pedal and second pedal are at their zenith and nadir positions, alternatively,
    wherein the rotating bar comprises at least two slide guides adapted for actuating the wheel, wherein the two slide guides are fixedly and slidably coupled to the rotating bar and adapted and arranged for adjusting a distance of each end from a center point of the rotating bar.

10. The crank system of claim 1, further comprising a motion transferring device coupled to the rotating bar and a wheel gear of the wheel gear assembly for transferring motion from the rotating bar to the wheel, wherein the motion transferring device simultaneously engages two opposing ends of the rotating bar and the wheel gear when the first pedal and second pedal are at their zenith and nadir positions, alternatively.

11. The crank system of claim 10, wherein the rotating bar comprises a first and second cog at opposing ends of the rotating bar for engaging the motion transferring device.

12. The crank system of claim 9, wherein the rotating bar comprises a first set of teeth and a second set of teeth integrally formed on opposing ends of the rotating bar.

13. The crank system of claim 9, wherein the rotating bar is coupled to a second axle and the rotating bar is fixedly coupled to the first axle by a motion transferring device adapted for engaging a first gear coupled to the first axle and a second gear coupled to the rotating bar.

* * * * *